(12) United States Patent
Song (10) Patent No.: US 12,229,523 B2
(45) Date of Patent: Feb. 18, 2025

(54) SEARCH-ENGINE-AUGMENTED DIALOGUE RESPONSE GENERATION WITH CHEAPLY SUPERVISED QUERY PRODUCTION

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 268 days.

(21) Appl. No.: 17/903,223

(22) Filed: Sep. 6, 2022

(65) Prior Publication Data
US 2024/0078393 A1    Mar. 7, 2024

(51) Int. Cl.
G10L 15/22    (2006.01)
G06F 40/49    (2020.01)
G06F 40/56    (2020.01)

(52) U.S. Cl.
CPC .............. *G06F 40/49* (2020.01); *G06F 40/56* (2020.01); *G10L 15/22* (2013.01)

(58) Field of Classification Search
CPC ....................................................... G10L 15/22
See application file for complete search history.

(56) References Cited

U.S. PATENT DOCUMENTS 11,481,646 B2 * 10/2022 Kwiatkowski ......... G06N 3/045
2008/0222140 A1 * 9/2008 Lagad ................... G06F 16/951
707/999.005
2021/0004439 A1    1/2021 Xiong et al.
2021/0217408 A1 * 7/2021 Hakkani-Tur ........... G06N 3/02
2021/0342399 A1    11/2021 Sisto et al.

OTHER PUBLICATIONS

Wang, et al. "Policy Learning Using Weak Supervision," NeurIPS 2021. (Year: 2021).*
Wang, et al., "Policy Learning Using Weak Supervision," NeurIPS 2021 (see attached reference in the previous Office action). (Year: 2021).*
Ante Wang et al."Search-Engine-augmented Dialogue Response Generation with Cheaply Supervised Query Production" arXiv:2302.09300v1, Feb. 2023, (29 pages).
Philipp Meerkamp, et al "Boosting Information Extraction systems with Character-level Neural Networks and Free Noisy Supervision" Proceeding of the 2nd Workshop on Structured Prediction for Natural Language Processing, pp. 44-51, Denmark, Sep. 2017, (8 pages).
International Search Report dated Aug. 25, 2023 in International Application No. PCT/US2023/022749.
Written Opinion dated Aug. 25, 2023 in International Application No. PCT/US2023/022749.

* cited by examiner

*Primary Examiner* — Feng-Tzer Tzeng
(74) *Attorney, Agent, or Firm* — Sughrue Mion, PLLC (57) ABSTRACT

Method, apparatus, and non-transitory storage medium for neural network based dialogue generation, including receiving an input dialogue context, and generating queries based on the input dialogue context using a query generating neural network. The query generating neural network may be trained using a cheap noisy supervision function. The method may further include retrieving responses from a web-based search engine based on the generated queries, and generating dialogue based on the retrieved responses and the input dialogue context.

18 Claims, 4 Drawing Sheets

SEARCH-ENGINE-AUGMENTED DIALOGUE RESPONSE GENERATION WITH CHEAPLY SUPERVISED QUERY PRODUCTION

FIELD

Embodiments of the present disclosure relate to language processing using artificial intelligence and machine learning. More specifically, embodiments of the present disclosure relate to dialogue generation using artificial intelligence and machine learning based methods and systems.

BACKGROUND

Techniques for knowledge-aided dialogue response generation aim to augment online systems such as chat-bots with relevant external knowledge so that said systems may generate informative responses without being resource intensive. Most of the techniques in related art retrieve information and respond to queries based on static or near-static pool of knowledge. However, systems that rely on such static or near-static pool of knowledge do not implement efficiently or accurately in real-world situations, where knowledge is continually updated and systems have to dynamically retrieve the most relevant and useful knowledge.

Therefore, a system, framework, and/or model that can access the vast and dynamic information from a web-based engine for response generation may be needed.

SUMMARY

According to embodiments, a method for neural network based dialogue generation. The method may include receiving an input dialogue context; generating queries based on the input dialogue context using a query generating neural network, wherein the query generating neural network is trained using a cheap noisy supervision function; retrieving responses from a web-based search engine based on the generated queries; and generating dialogue based on the retrieved responses and the input dialogue context.

According to embodiments, an apparatus for neural network based dialogue generation may be provided. The apparatus may include at least one memory configured to store program code; and at least one processor configured to read the program code and operate as instructed by the program code. The program code may include receiving code configured to cause the at least one processor to receive an input dialogue context; first generating code configured to cause the at least one processor to generate queries based on the input dialogue context using a query generating neural network, wherein the query generating neural network is trained using a cheap noisy supervision function; retrieving code configured to cause the at least one processor to retrieve responses from a web-based search engine based on the generated queries; and second generating code configured to cause the at least one processor to generate dialogue based on the retrieved responses and the input dialogue context.

According to embodiments, a non-transitory computer-readable medium storing instructions may be provided. The instructions, when executed by at least one processor for neural network based dialogue generation may cause the at least one processor to receive an input dialogue context; generate queries based on the input dialogue context using a query generating neural network, wherein the query generating neural network is trained using a cheap noisy supervision function; retrieve responses from a web-based search engine based on the generated queries; and generate dialogue based on the retrieved responses and the input dialogue context.

DETAILED DESCRIPTION

Embodiments of the present disclosure relate to methods, apparatus, and systems for neural network based dialogue generation.

As stated above, related techniques for knowledge-aided dialogue response generation aim to augment online systems such as chat-bots with relevant external knowledge so that said systems may generate informative responses without being resource intensive. Most of the techniques in related art retrieve information and respond to queries based on static or near-static pool of knowledge. However, systems that rely on such static or near-static pool of knowledge do not implement efficiently or accurately in real-world situations, where knowledge is continually updated and systems have to dynamically retrieve the most relevant and useful knowledge.

Therefore, a system, framework, and/or model that can access the vast and dynamic information from a web-based engine for response generation may be needed.

Embodiments of the present disclosure relate to dialogue generation model that can access a vast and dynamic information using any web-based search engine for dialogue and/or response generation. According to an aspect of the present disclosure, a query producer may be used to generate queries from a dialogue context to interact with a search engine. A training algorithm based on cheap noisy supervision may be used for the query producer, where the signals may be obtained by comparing retrieved articles with the next dialogue response. As the result, the query producer may be adjusted without any human annotation of gold queries, making it easily transferable to other domains and search engines.

Initial efforts relating to knowledge-aided response generation begin with treating relevant knowledge (e.g., news or movie reviews) as input and design dialogue systems that can effectively utilize the provided knowledge. However, this static setting runs contrary to the dynamic nature of real-world scenarios, giving rise to approaches that can retrieve and select information from a knowledge source for response generation. Knowledge sources considered in related art includes larger static pool of articles (e.g., a Wikipedia dump). The queries and articles are represented as sparse vectors of n-grams or even dense contextualized vectors for retrieval. However, these approaches with a larger static pool of knowledge still fall short of taking the dynamic nature of relevant information into account.

Therefore, embodiments of the present disclosure relate to dialogue generation model that can access a vast and dynamic information using any web-based search engine for dialogue and/or response generation. In related art, dialogue generation model based on web-based search engine results use manually annotated queries and supervision signals to train the query generator. Manually annotated supervision signals are expensive to obtain and may not be transferable to other domains and search engines. According to an aspect of the present disclosure, the query producer that interacts with the web-based search engine does not require manually annotated queries for training. According to another aspect, the query producer disclosed herein is search-engine agnostic, based on an algorithm that obtains annotation-free and effective signals for training the query producer.

Dialogue generation model based on web-based search engine has several advantages. First, search engines (e.g., Google, Bing, etc.) store continually updating knowledge, which well captures the dynamic nature of the real-world. Second, the difficulties associated with the building of custom search engines with $n$-grams and dense contextualized vectors is avoided because the ranking algorithms of well-established search engines are highly optimized.

According to an embodiment of the present disclosure, the framework and/or model(s) presented herein may include a query producer and a response generator. The query producer may generate queries from a dialogue context. Then, queries may be sent to a search engine to obtain relevant articles. The response generator may take both the retrieved articles and the dialogue context to generate a response.

According to an aspect, the query producer may determine the quality of fetched knowledge, which in turn affects response generation. However, annotating gold queries are costly, because annotators usually need to examine multiple candidate queries by looking into their fetched articles. To obtain automatic training signals for our query producer, a function based on existing cheap noisy supervision may be used for scoring queries. The function may compare the retrieved articles associated with a query with the corresponding gold response to estimate the quality of the query.

The scoring function does not require extra annotations, such as gold queries, making our model easily transferable to other domains and search engines.

Figure 1:
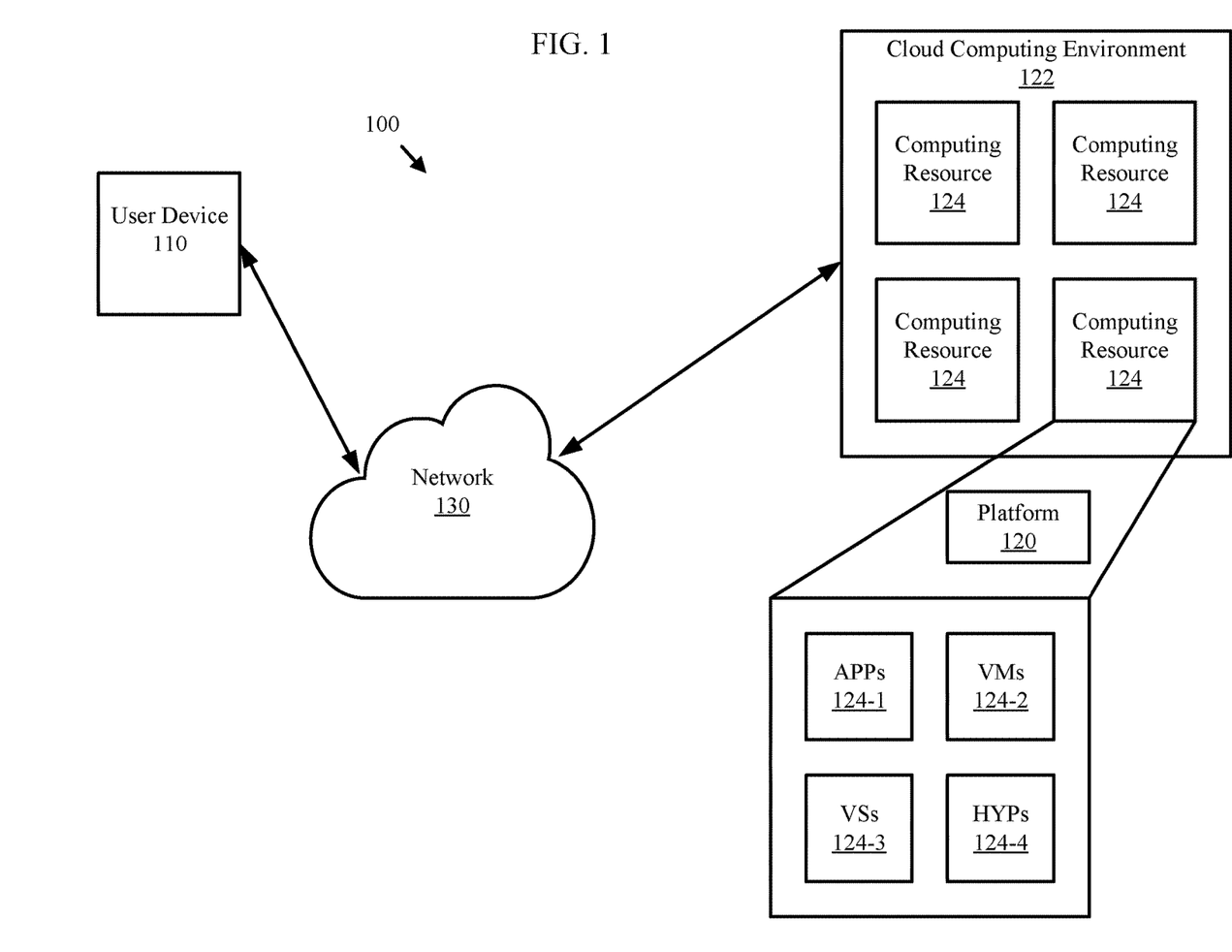
FIG. 1 is a diagram of an environment in which methods, apparatuses, and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
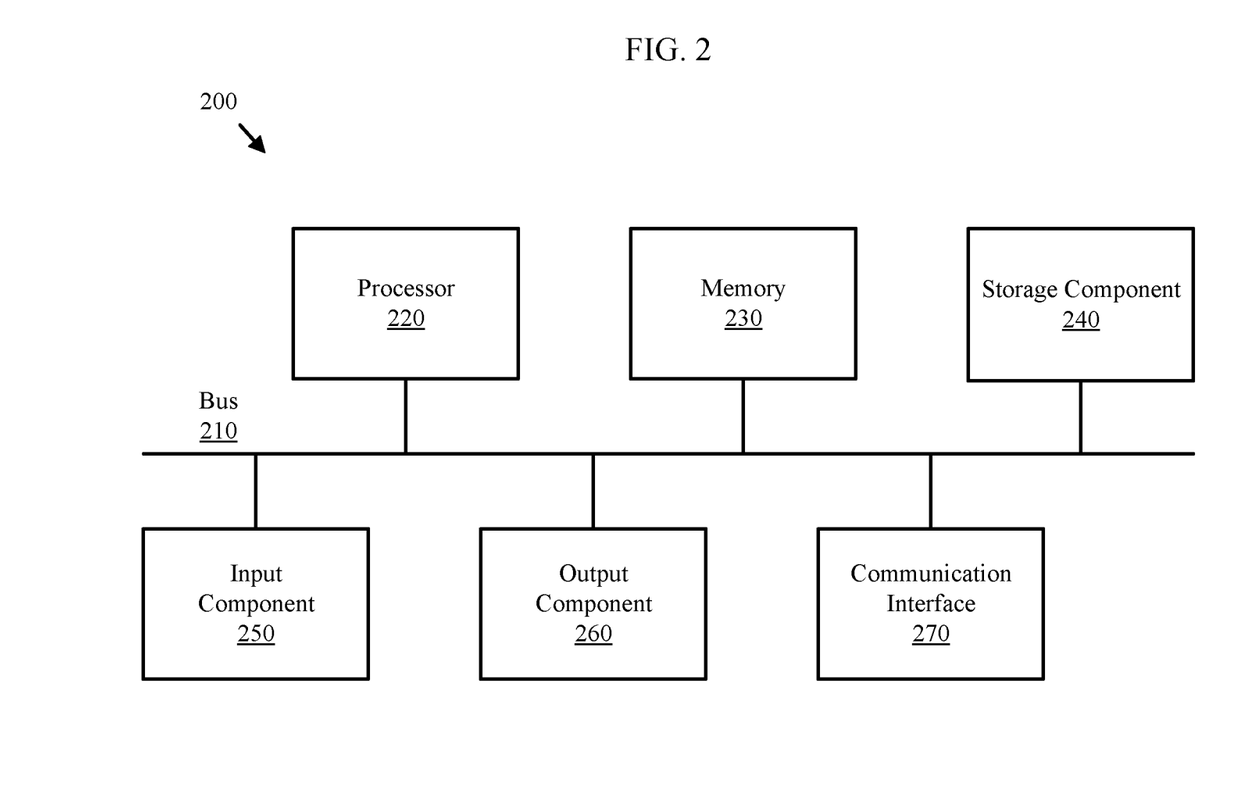
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
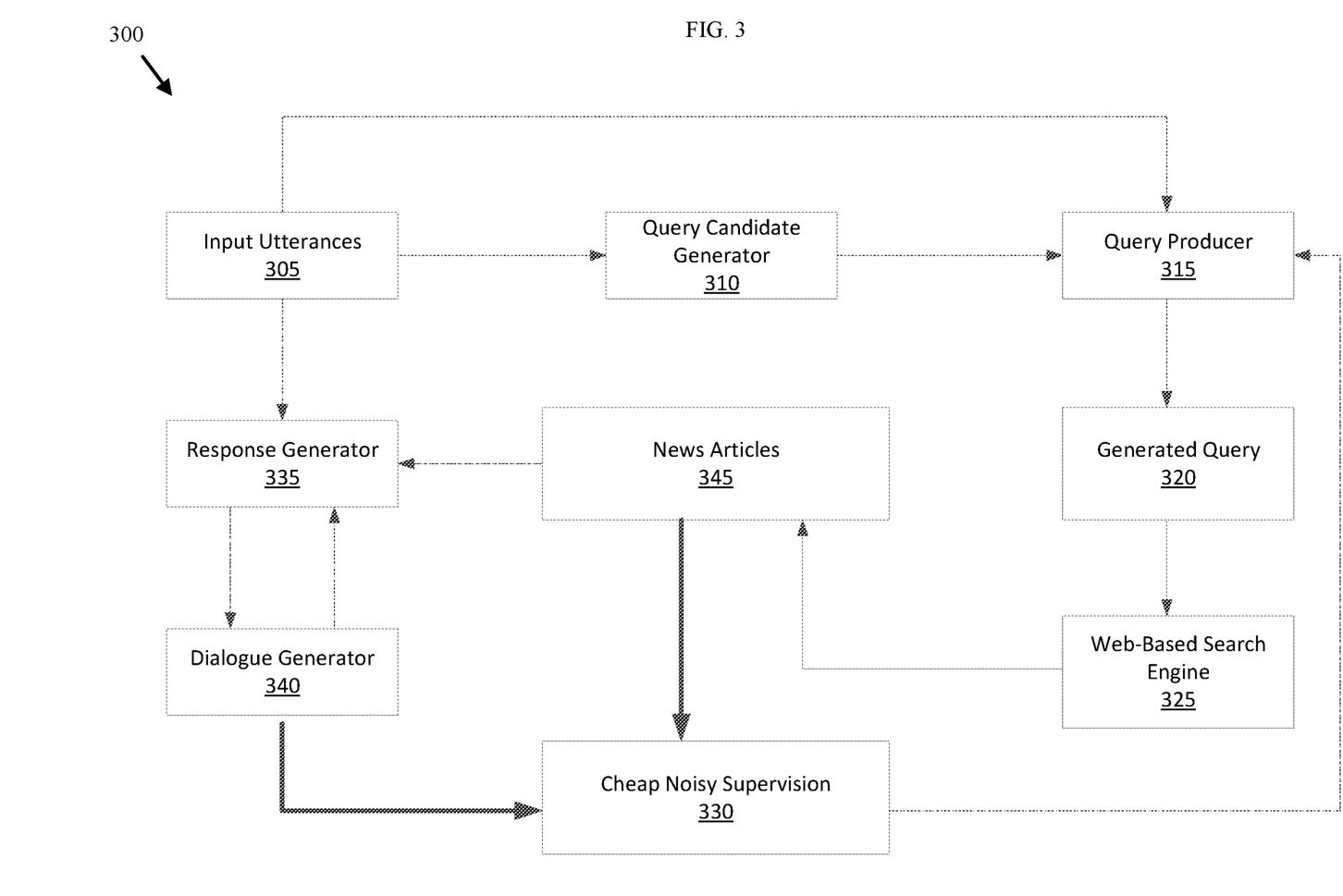
FIG. 3 is a diagram of an exemplary method for neural network based dialogue generation, according to embodiments.

FIG. 3 is a block diagram of an exemplary framework for neural network based dialogue generation. As shown in FIG. 3, a framework 300 may include one or more input utterances 305, query candidate generator 310, query producer 315, generated query 320, one or more web-based search engines 325, cheap noisy supervision function 330, response generator 335, and dialogue generator 340.

Given an input utterance 305 or dialogue context of prior $t-1$ turns $D_{<t}=\{u_1, u_2, \ldots, u_{t-1}\}$, the query producer 315 (which may be implemented as a neural network) may predict a query $\tilde{q}$ from a set of query candidates $Q=\{q^1, q^2, \ldots, q^{|Q|}\}$. The query candidates may be generated using a query candidate generator 310. The query producer 315 may select query $\tilde{q}$ using a heuristic and/or neural network based algorithm, before sending it to one or more search engines 325 for retrieving a list of news articles $K^{\tilde{q}}=\{k_1^{\tilde{q}}, k_2^{\tilde{q}}, \ldots, k_{|K^{\tilde{q}}|}^{\tilde{q}}\}$ from news articles 345. With the retrieved news articles $K^{\tilde{q}}$ and input dialogue context $D_{<t}$, a response generator 335 may generate a response $u_t$.

According to an aspect, there may be two popular directions based on extraction to build the query producer. The query search space may be further pruned to minimize the number of possible queries and speed up training. Then, cheap noisy supervisions may be used to train the query producers with Maximum Likelihood Estimation (MLE) based pre-training and reinforcement learning fine-tuning.

According to an aspect, the query candidate generator 310 may be an extraction-based query candidate generator and may aim to extract text spans from the dialogue context $D_{<t}$ as queries. In some embodiments, the query producer 315 may be an extraction-based query producer and may aim to extract text spans from the dialogue context $D_{<t}$ as queries. A pre-trained language model (PLM) may form the backbone of the query producer 315 and one or more linear layers with the softmax activation (e.g., MLP-Softmax) may comprise output layer(s) to predict the probability distribution P over all query candidates $Q=[q^1, \ldots, q^{|Q|}]$ $$P=\text{MLP-Softmax}([H^{q^1}, \ldots, H^{q^{|Q|}}]) \quad \text{Eqn (1)}$$

$$H^{q^i}=\text{MeanPooling}(H_{beg_i:end_i}) \quad \text{Eqn (2)}$$

$$H=\text{PLM}(D_{<t}) \quad \text{Eqn (3)}$$

Where H represents the contextualized embeddings produced by PLM, and $beg_i$ and $end_i$ are the begin and end indices for the i-th candidate span in $D_{<t}$. Each candidate query $q^i$ is a continuous span in a turn of $D_{<t}$. Representation $H^{q^i}$ may be generated using suitable pooling techniques (e.g., MeanPooling) over the contextualized embeddings of its tokens from $beg_i$ to $end_i$.

Querying the one or more web-based search engines 325 can be time consuming for training the query producer 315 because the training process can take hundreds of thousands of steps, and each query can take more than 0.1 seconds. Solutions for this issue may include creating an offline cache of articles for all possible queries before the actual training. However, the extraction-based model takes a large search space of candidate queries. Given a dialogue of m turns with n words for each turn, there are $O(m \cdot n^2)$ possible queries for the extraction-based model. Therefore, it is necessary to prune the search space for query production so that an offline cache can be efficiently established, while the coverage of the pruned space is still large enough.

In particular, a first pruning method may include dictionary-based pruning. Dictionary-based pruning methods may consider the overlap between each dialogue context and a predefined taxonomy as the search space, where the taxonomy is constructed from a large knowledge source (e.g. Wikipedia). In some embodiments, a second pruning method may include metric-based pruning. Metric-based pruning may include extracting keywords from a dialogue context based on metric scores (e.g., TF-IDF) without using any vocabulary, and then they merge adjacent keywords into larger spans by heuristic rules.

Training the Query Producer Using Cheap Noisy Supervision

A cheap noisy supervision signal may be leveraged to train our query producers, making it easier to transfer to other domains and search engines compared to when using human annotations. The training process of the query producer 315 may contain pre-training with a suitable loss function (e.g., cross-entropy loss) and reinforcement learning based fine-tuning. The reinforcement learning fine-tuning may directly use the supervision signals as reward, while the pre-training may use the supervision signals as gold labels.

Cheap Noisy Supervision Function for Query Scoring

A cheap noisy supervision function 330, also referred to as function $f$ may be a function that determines and/or generates a score for each query. The score may indicate the a quality of the query. The cheap noisy supervision function 330 may leverage a corresponding gold response u as cheap noisy supervision to assign a score $s_q$ for each query q to indicate its quality. In particular, the function $f$ may compare the corresponding top articles $K^q=\{k_1^q, k_2^q, \ldots\}$ retrieved by q with the gold response u for calculating score $s_q$ $$s^q = f(K^q, u) \quad \text{Eqn (4)}$$

This is a type of cheap supervision because the function $f$ does not require extra annotations (e.g., the annotations of gold queries).

As an example, a popular BM25 metric to may be used to implement $f$. The BM25 metric may first calculate the score for each article by $s_i^q=\text{BM25}(k_i^q, u)$, before determining the overall score $s^q$ as the maximum among them: $s^q=\max(\{s_1^q, s_2^q, \ldots\})$. It may be understood that the use of BM25 metric is merely exemplary, and any suitable metric and/or function may be used instead of and/or in combination with.

One or more pre-processing methods may also be implemented for improving upon the BM25. The first method may include adopting a co-reference resolution, which may find the actual entity referred by a pronoun, and then may expand response u by concatenating it with the entity mentions referred by its pronouns. This may be an important preprocessing operation because co-reference frequently exists in human conversations. The second method may include dropping one or more function words from both articles K and response u before passing them to the noisy supervision function $f$. This may make $f$ focus more on content words.

Pre-Training with Noisy Labels

Subsequent to pre-processing, the query with the highest score $s^q$ by function $f$ from query candidates Q may be taken as pseudo ground-truth to train both extraction-based and generation-based query producers (e.g., query producer 315) with an appropriate loss function, for example, a standard cross-entropy loss:

$$L_{ext}^{pt} = -\log P(\bar{q}|D_{<t}, \theta_{ext}) \quad \text{Eqn (5)}$$

Where q̄ may denote the pseudo ground-truth, $L_{ext}^{pt}$ may be the loss term for extraction-based query producer model, and $\theta_{ext}$ may be the parameters for the extraction-based query producer model.

Fine-Tuning Using Reinforcement Learning

An appropriate fine-tuning algorithm may be used with the cheap noisy supervision $f$ as the reward. As an example, a REINFORCE algorithm may be used for fine-tuning the query producer 315. A baseline value may be subtracted, the baseline value being set to the reward of the candidate query with the highest model score from $f$ to reduce variance. If, the cheap noisy supervision function is not bounded, as for example, the BM25 function/scores are not bounded, further normalization may be carried out to reduce training variance. In some embodiments, for each dialog turn with multiple query candidates, the reward $r_i$ may be rescaled for the i-th candidate as $$\frac{r_i - \min}{\max - \min} - 0.5$$

with the minimum (min) and maximum (max) values within the candidates. The losses for the producer at fine-tuning stage is defined as:

$$L^{ft} = -\Delta(r_s, r_b)\log p_s \quad \text{Eqn (6)}$$

Where $p_s$ may be the probability of a candidate query sampled from the model output distribution, $r_s$ and $r_b$ may be the rescaled rewards for the sampled and the baseline candidates, respectively.

Advantages of Embodiments

Table 1 describes the effectiveness, accuracy, and especially the usefulness of knowledge retrieval using search queries for response generation using the framework, models, and methods presented herein. The Wizard-of-Wikipedia ("WoW") dataset has been used for evaluation, with the WoW dataset being split into 18,430 dialogues, 967 dialogues, and 968 dialogues for training, development, and testing, respectively.

TABLE 1

Query Production on the WoW dataset

| Query/KN Production | Avg. Num. Querying | Query Ranking | | |
|---|---|---|---|---|
| | | R@1 | R@3 | R@5 |
| None | — | — | — | — |
| Last 2 turns | 8.29 | — | — | — |
| Last 4 turns | 13.38 | — | — | — |
| All history | 17.45 | — | — | — |
| Concat | 1 | 4.15 | 5.45 | 5.88 |
| TF-IDF | 1 | 43.41 | 61.63 | 66.65 |
| QP-Ext | 1 | 62.41 | 72.91 | 74.87 |
| QP-Gen | 1 | 56.77 | 66.08 | 68.22 |

The notation R@x (x∈{1, 3, 5}), compares the top x retrieved candidates with ground-truth knowledge to evaluate the performance of query producer. As shown in Table 1, models implementing the embodiments disclosed herein using either of the proposed query producers perform better than all baselines for most situations, indicating that the query producer trained with cheap noisy supervision signals disclosed herein can retrieve useful contents for response generation.

Figure 4:
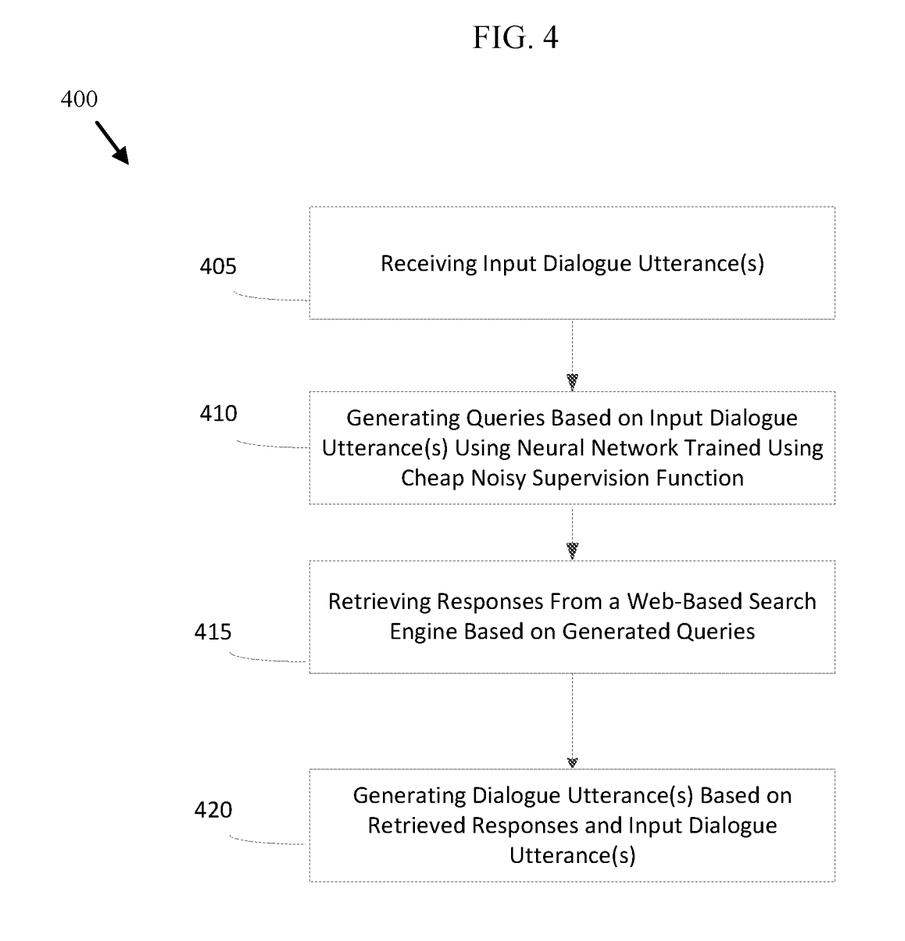
FIG. 4 illustrates a flowchart for neural network based dialogue generation, according to embodiments.

FIG. 4 is an illustration of an exemplary process 400 for neural network based dialogue generation, according to embodiments.

At operation 405, one or more an input dialogue contexts may be received. As an example, input utterances 305 may be received. In some embodiments, the input utterances may be considered as input dialogue contexts comprising of a plurality of turns.

At operation 410, queries based on the input dialogue context using a query generating neural network may be generated. As an example, query producer 315 may generate queries based on the input dialogue context.

In some embodiments, prior to generating the queries, the input dialogue context may be preprocessed. Pre-processing may include determining at least one entity referenced by a pronoun in the input dialogue context. Pre-processing may also include generating content focused input dialogue context based on discarding function words from the input dialogue context.

According to an aspect, generating the queries based on the input dialogue may include generating contextualized embeddings based on a pre-trained language model, and determining a probability distribution associated with the input dialogue context based on the generated contextualized embeddings. In some embodiments, the generated queries comprise one or more text spans based on the input dialogue context.

In some embodiments, the query generating neural network may be trained using a cheap noisy supervision function. As an example, the query producer 315 may be trained using the cheap noisy supervision function 330.

According to an aspect, scoring queries using the cheap supervision function may include comparing a plurality of articles associated with a query among one or more queries with a gold response associated with the query among the one or more queries. Then, a score for the query among the one or more queries may be generated based on the comparing, wherein the score indicates a quality associated with the query.

In some embodiments, generating the score for the one or more queries may include generating an article score for each of the plurality of articles associated with the query among the one or more queries, and determining the score for the one or more queries based on a maximum article score among the article score for each of the plurality of articles associated with the query among the one or more queries.

Training the query generating neural network using the cheap noisy supervision function may include determining a query among one or more queries with a highest score based on the cheap noisy supervision function. The determined query may be used to train the query generating neural network. Subsequently, the training may include fine-tuning the query generating neural network based on a reward-based algorithm and a loss function. In some embodiments, the loss function may be based on a minimum score and the highest score associated with the query among the one or more queries.

At operation 415, responses from a web-based search engine based on the generated queries may be retrieved. As an example, responses from the one or more web-based search engines 325 may be retrieved based on the queries generated by the query producer 315.

At operation 420, dialogue based on the retrieved responses and the input dialogue context may be generated. As an example, dialogue(s) may be generated by the dialogue generator 340 based on the retrieved responses from the response generator 335 and the input dialogue context.

According to some embodiments, operations 405-420 may be may be executed using an apparatus configured to execute code, each operation corresponding to codes such as receiving code, determining code, generating code, etc.

Embodiments of the present disclosure also provide the flexibility to adjust learning-based substitution, quantization, encoding, and decoding methods, online or offline based on the current data, and support different types of learning-based quantization methods, including DNN-based or conventional model-based methods. The described method also provides a flexible and general framework that accommodates different DNN architectures and a plurality of quality metrics.

The proposed methods may be used separately or combined in any order. Further, each of the methods (or embodiments) may be implemented by processing circuitry (e.g., one or more processors or one or more integrated circuits) or may be implemented using software code (e.g., generating code, receiving code, encoding code, decoding code, etc.). In one example, the one or more processors execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for neural network based dialogue generation, the method being performed by at least one processor, the method comprising:
   receiving an input dialogue context;
   determining at least one entity referenced by a pronoun in the input dialogue context;
   generating content focused input dialogue context based on discarding function words from the input dialogue context;
   generating queries based on the input dialogue context using a query generating neural network, wherein the query generating neural network is trained using a cheap noisy supervision function;
   retrieving responses from a web-based search engine based on the generated queries; and
   generating dialogue based on the retrieved responses and the input dialogue context.

2. The method of claim 1, wherein the cheap noisy supervision function comprises:
   comparing a plurality of articles associated with a query among one or more queries with a gold response associated with the query among the one or more queries; and
   generating a score for the query among the one or more queries based on the comparing, wherein the score indicates a quality associated with the query.

3. The method of claim 2, wherein generating the score for the one or more queries comprises:
   generating an article score for each of the plurality of articles associated with the query among the one or more queries; and
   determining the score for the one or more queries based on a maximum article score among the article score for each of the plurality of articles associated with the query among the one or more queries.

4. The method of claim 1, wherein training the query generating neural network using the cheap noisy supervision function comprises:
   determining a query among one or more queries with a highest score based on the cheap noisy supervision function;
   training the query generating neural network based on the determined query; and
   fine-tuning the query generating neural network based on a reward-based algorithm and a loss function.

5. The method of claim 4, wherein the loss function is based on a minimum score and the highest score associated with the query among the one or more queries.

6. The method of claim 1, wherein the generating the queries based on the input dialogue context comprises:
   generating contextualized embeddings based on a pre-trained language model; and
   determining a probability distribution associated with the input dialogue context based on the generated contextualized embeddings.

7. The method of claim 1, wherein the generated queries comprise one or more text spans based on the input dialogue context.

8. An apparatus for neural network based dialogue generation, the apparatus comprising:
   at least one memory configured to store program code; and at least one processor configured to read the program code and operate as instructed by the program code, the program code comprising:

receiving code configured to cause the at least one processor to receive an input dialogue context;

first determining code configured to cause the at least one processor to determine at least one entity referenced by a pronoun in the input dialogue context;

first generating code configured to cause the at least one processor to generate content focused input dialogue context based on discarding function words from the input dialogue context;

second generating code configured to cause the at least one processor to generate queries based on the input dialogue context using a query generating neural network, wherein the query generating neural network is trained using a cheap noisy supervision function;

retrieving code configured to cause the at least one processor to retrieve responses from a web-based search engine based on the generated queries; and third generating code configured to cause the at least one processor to generate dialogue based on the retrieved responses and the input dialogue context.

9. The apparatus of claim 8, wherein the cheap noisy supervision function comprises:

comparing code configured to cause the at least one processor to compare a plurality of articles associated with a query among one or more queries with a gold response associated with the query among the one or more queries; and fourth generating code configured to cause the at least one processor to generate a score for the query among the one or more queries based on the comparing, wherein the score indicates a quality associated with the query.

10. The apparatus of claim 9, wherein the fourth generating code comprises:

fifth generating code configured to cause the at least one processor to generate an article score for each of the plurality of articles associated with the query among the one or more queries; and second determining code configured to cause the at least one processor to determine the score for the one or more queries based on a maximum article score among the article score for each of the plurality of articles associated with the query among the one or more queries.

11. The apparatus of claim 8, wherein training code is configured to cause the at least one processor to train the query generating neural network using the cheap noisy supervision function, and wherein the training code comprises:

fourth determining code configured to cause the at least one processor to determine a query among one or more queries with a highest score based on the cheap noisy supervision function;

query model training code configured to cause the at least one processor to train the query generating neural network based on the determined query; and fine-tuning code configured to cause the at least one processor to fine-tune the query generating neural network based on a reward-based algorithm and a loss function.

12. The apparatus of claim 11, wherein the loss function is based on a minimum score and the highest score associated with the query among the one or more queries.

13. The apparatus of claim 8, wherein the second generating code comprises:

seventh generating code configured to cause the at least one processor to generate contextualized embeddings based on a pre-trained language model; and fourth determining code configured to cause the at least one processor to determine a probability distribution associated with the input dialogue context based on the generated contextualized embeddings.

14. A non-transitory computer readable medium storing instructions that, when executed by at least one processor for neural network based dialogue generation, cause the at least one processor to:

receive an input dialogue context;

determine at least one entity referenced by a pronoun in the input dialogue context;

generate content focused input dialogue context based on discarding function words from the input dialogue context;

generate queries based on the input dialogue context using a query generating neural network, wherein the query generating neural network is trained using a cheap noisy supervision function;

retrieve responses from a web-based search engine based on the generated queries; and generate dialogue based on the retrieved responses and the input dialogue context.

15. The non-transitory computer readable medium of claim 14, wherein training the query generating neural network using the cheap noisy supervision function comprises:

determining a query among one or more queries with a highest score based on the cheap noisy supervision function;

training the query generating neural network based on the determined query; and fine-tuning the query generating neural network based on a reward-based algorithm and a loss function.

16. The non-transitory computer readable medium of claim 15, wherein the loss function is based on a minimum score and the highest score associated with the query among the one or more queries.

17. The non-transitory computer readable medium of claim 14, wherein generating the queries based on the input dialogue context comprises:

generating contextualized embeddings based on a pre-trained language model; and determining a probability distribution associated with the input dialogue context based on the generated contextualized embeddings.

18. The non-transitory computer readable medium of claim 14, wherein the generated queries comprise one or more text spans based on the input dialogue context.

* * * * *